United States Patent
Goring et al.

(10) Patent No.: US 7,793,281 B2
(45) Date of Patent: Sep. 7, 2010

(54) SYSTEM AND METHOD FOR DYNAMIC VERSION MANAGEMENT OF APPLICATIONS

(75) Inventors: Bryan R. Goring, Milton (CA); Michael Shenfield, Richmond Hill (CA); Viera Bibr, Kilbride (CA)

(73) Assignee: Research In Motion Limited, Waterloo (CA)

( * ) Notice: Subject to any disclaimer, the term of this patent is extended or adjusted under 35 U.S.C. 154(b) by 1478 days.

(21) Appl. No.: 10/787,951

(22) Filed: Feb. 27, 2004

(65) Prior Publication Data

US 2005/0193382 A1 Sep. 1, 2005

Related U.S. Application Data

(60) Provisional application No. 60/503,979, filed on Sep. 17, 2003.

(51) Int. Cl.
*G06F 9/44* (2006.01)
*G06F 7/00* (2006.01)

(52) U.S. Cl. ............ 717/170; 707/621; 707/638; 717/120

(58) Field of Classification Search ....... 455/3.01–3.03; 707/10, 621, 638; 717/168–178, 120
See application file for complete search history.

(56) References Cited

U.S. PATENT DOCUMENTS 5,881,292 A * 3/1999 Sigal et al. .................. 717/170

(Continued)

FOREIGN PATENT DOCUMENTS

EP 0 811 911 A 12/1997

EP 1 049 005 A 11/2000

OTHER PUBLICATIONS

International Preliminary Report on Patentability for PCT International Application No. PCT/CA2004/000196, Mar. 30, 2006, 6 pages, International Preliminary Examining Authority.

(Continued)

*Primary Examiner*—Diem K Cao
*Assistant Examiner*—Charles E Anya
(74) *Attorney, Agent, or Firm*—Gowling Lafleur Henderson LLP

(57) ABSTRACT

Current applications, in particular for resource constrained terminals, may only require access to an updated version of an application, but updates of current applications must typically be downloaded in their entirety. Further, multiple versions of the same application typically cannot be stored on the device, as resources can be limited. Contrary to current application management systems, there is provided systems and methods of modifying an application program for provisioning in a runtime environment of a terminal, the application including a plurality of uniquely addressable logical modules having respective executable methods, where the modules are linked by a set of execution pathways. One such method comprises the steps of obtaining a migration instruction set for coordinating the modification of the application and executing the migration instruction set for modifying a first execution pathway of the execution pathways to create a modified application. The first execution pathway represents a redirectable shared method call of a first executable method linking a pair of the modules, the first executable method being of the respective executable methods. This method also includes constructing an addressing map for mapping a direct relationship between the redirected shared method call and a corresponding private address of the first executable method, the private address configured for use by one of the pair of modules as an internal reference to the first executable method. The resulting updated version of the application is represented by a stored addressing map for coordinating hosting of the modified application in the runtime environment, as well as any associated modules.

42 Claims, 7 Drawing Sheets

U.S. PATENT DOCUMENTS

| | | | | |
|---|---|---|---|---|
| 6,782,527 | B1* | 8/2004 | Kouznetsov et al. | 717/103 |
| 6,993,760 | B2* | 1/2006 | Peev et al. | 717/174 |
| 7,155,712 | B2* | 12/2006 | Takimoto | 717/170 |
| 7,260,818 | B1* | 8/2007 | Iterum et al. | 717/170 |
| 2002/0032768 | A1* | 3/2002 | Voskuil | 709/224 |
| 2002/0042833 | A1* | 4/2002 | Hendler et al. | 709/231 |

OTHER PUBLICATIONS

Emin Gün Sirer et al: "A Practical Approach for Improving Startup Latency in Java Applications" Workshop on Compiler Support for System Software and ACM SIGPLAN, May 1, 1999, pp. 47-55, XP001188167 abstract p. 47, last paragraph—p. 48, line 20—p. 49, line 26—p. 50, line 12.

International Search Report and Written Opinion, Aug. 19, 2005, pp. 1-4.

Tao Zhang et al, "Leakage-Proof Program Partitioning", Sep. 8, 2002, p. 136-145, XP2297516.

European Examination Report for European Application No. 04710759.4, Dec. 22, 2006, 4 pages, European Patent Office.

Office Action issued by the Canadian Intellectual Property Office dated Jan. 29, 2008 for corresponding Canadian Patent Application No. 2,539,460.

Office Action issued by the Canadian Intellectual Property Office dated Mar. 18, 2010 for corresponding Canadian Patent Application No. 2,539,460.

* cited by examiner

US 7,793,281 B2

SYSTEM AND METHOD FOR DYNAMIC VERSION MANAGEMENT OF APPLICATIONS

This application claims the benefit of provisional application No. 60/503,979 filed Sep. 17, 2003, which is incorporated herein by this reference.

BACKGROUND

The present application relates to management of application versions.

There is a continually increasing number of terminals in use today, such as mobile telephones, PDAs with wireless communication capabilities, personal computers, self service kiosks and two-way pagers. Software applications which run on these terminals increase their utility. For example, a mobile phone may include an application which retrieves the weather for a range of cities, or a PDA may include an application that allows a user to shop for groceries. These software applications take advantage of the connectivity to a network in order to provide timely and useful services to users. However, due to the restricted resources of some terminals, and the complexity of delivering large amounts of data to the devices, developing and maintaining software applications remains a difficult and time-consuming task.

Markup languages, such as Extended Markup Language (XML), are becoming standard for presenting, formatting and exchanging generic data on networked terminals. For example, XML can be implemented by virtually all platforms and environments and can allow for seamless integration of heterogeneous systems using common data interfaces. XML processing is supported by core programming languages, XML-based languages (e.g. XPATH, XQUERY) and script language extensions (e.g. ECMAScript for XML-E4X).

Current applications, in particular for resource constrained terminals, can require excessive storage space and undesirable download times/bandwidth. For example, users of the terminal may only require access to an updated version of an application, but updates of current applications must typically be downloaded in their entirety. Further, multiple versions of the same application typically cannot be stored on the device, as resources can be limited.

Systems and methods are provided for dynamic management of applications to obviate or mitigate the aforementioned disadvantages.

SUMMARY

Current applications, in particular for resource constrained terminals, can require excessive storage space and undesirable download times/bandwidth. For example, users of the terminal may only require access to an updated version of an application, but updates of current applications must typically be downloaded in their entirety. Further, multiple versions of the same application typically cannot be stored on the device, as resources can be limited. Contrary to current application management systems, there are provided systems and methods of modifying an application program for provisioning in a runtime environment of a terminal, the application including a plurality of uniquely addressable logical modules having respective executable methods, the modules linked by a set of execution pathways. One such method comprises the steps of: obtaining a migration instruction set for coordinating the modification of the application; executing the migration instruction set for modifying a first execution pathway of the execution pathways to create a modified application, the first execution pathway representing a redirectable shared method call of a first executable method linking a pair of the modules, the first executable method being of the respective executable methods; constructing an addressing map for mapping a direct relationship between the redirected shared method call and a corresponding private address of the first executable method, the private address configured for use by one of the pair of modules as an internal reference to the first executable method; and storing the addressing map for coordinating hosting of the modified application in the runtime environment.

A method of modifying an application program for provisioning in a runtime environment of a terminal is provided, the application including a plurality of uniquely addressable logical modules having respective executable methods, the modules linked by a set of execution pathways. This method comprises the steps of: obtaining a migration instruction set for coordinating the modification of the application; executing the migration instruction set for modifying a first execution pathway of the execution pathways to create a modified application, the first execution pathway representing a redirectable shared method call of a first executable method linking a pair of the modules, the first executable method being of the respective executable methods; constructing an addressing map for mapping a direct relationship between the redirected shared method call and a corresponding private address of the first executable method, the private address configured for use by one of the pair of modules as an internal reference to the first executable method; and storing the addressing map for coordinating hosting of the modified application in the runtime environment.

A terminal is further provided for modifying an application program for subsequent provisioning in a native runtime environment, the application configured for a plurality of uniquely addressable logical modules having respective executable methods, the modules linked by a set of execution pathways. The terminal comprises: a processing framework for providing the runtime environment; a migration module for coordinating the modification of the application using a migration instruction set, the migration instruction set configured for operation by the processing framework to modify a first execution pathway of the execution pathways to create a modified application, the first execution pathway configured for representing a redirectable shared method call of a first executable method linking a pair of the modules, the first executable method being of the respective executable methods; an addressing map module for constructing an addressing map, the addressing map configured for operation by the processing framework to map a direct relationship between the redirected shared method call and a corresponding private address of the first executable method, the private address configured for use by one of the pair of modules as an internal reference to the first executable method; and a storage medium for storing the addressing map for coordinating hosting of the modified application in the runtime environment.

Also disclosed is a computer program product for modifying an application program for subsequent provisioning in a native runtime environment, the application configured for having a plurality of uniquely addressable logical modules having respective executable methods, the modules linked by a set of execution pathways. The computer program product comprises: a computer readable medium; a migration module stored on the computer readable medium for coordinating the modification of the application using a migration instruction set, the migration instruction set configured for operation by the processing framework to modify a first execution pathway of the execution pathways to create a modified application, the first execution pathway configured for representing a redirectable shared method call of a first executable method linking a pair of the modules, the first executable method being of the respective executable methods; and an addressing map module coupled to the migration module for constructing an addressing map, the addressing map configured for operation by the processing framework to map a direct relationship between the redirected shared method call and a corresponding private address of the first executable method, the private address configured for use by one of the pair of modules as an internal reference to the first executable method.

A network server configured for interacting with a runtime environment of a terminal to modify an application program is also disclosed, the application including a plurality of uniquely addressable logical modules having respective executable methods, the modules linked by a set of execution pathways. The server comprises: a migration instruction set for communicating over the network to the terminal to coordinate the modification of the application, the migration instruction set configured for modifying a first execution pathway of the execution pathways to create a modified application, the first execution pathway representing a redirectable shared method call of a first executable method linking a pair of the modules, the first executable method being of the respective executable methods; and an addressing map associated with the migration instruction set for mapping a direct relationship between the redirected shared method call and a corresponding private address of the first executable method, the private address configured for use by one of the pair of modules as an internal reference to the first executable method.

BRIEF DESCRIPTION OF THE DRAWINGS

These and other features will become more apparent in the following detailed description in which reference is made to the appended example drawings, wherein.

DETAILED DESCRIPTION

Network System

Figure 1:
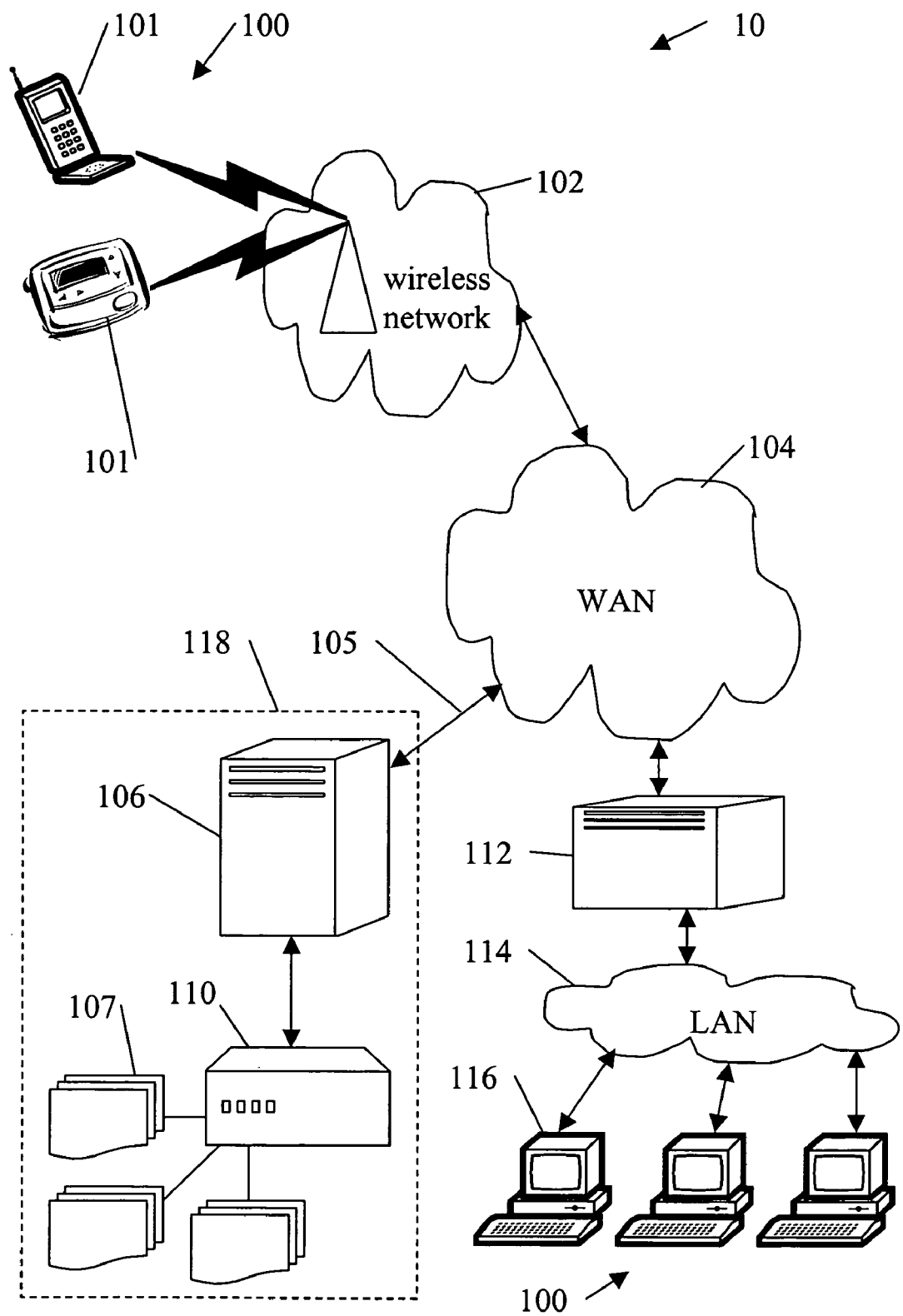
FIG. 1 is a block diagram of a network system.

Referring to FIG. 1, a network system 10 comprises a plurality of terminals 100 for interacting with one or more application servers 110 accessed by a server 106, which can be a management server, via a coupled Wide Area Network (WAN) 104 such as but not limited to the Internet. The server 106 can be considered as an external entity with which an application 107 may interact or receive messages 105 for updating the application 107 but need not be an external entity in all implementations. The generic terminals 100 can be any suitable computing platform such as but not limited to desktop terminals 116 or other wired devices (e.g., notebook computer), wireless devices 101, PDAs, self-service kiosks and the like. Information for the applications 107 to update can be obtained by the server 106 from an application server 110.

Further, the system 10 can also have a gateway server 112 for connecting the desktop terminals 116 (or other wired devices) via a Local Area Network (LAN) 114 to the server 106. Further, the system 10 can have a wireless network 102 for connecting the wireless devices 101 to the WAN 104. It is recognized that other terminals and computers (not shown) could be connected to the server 106 via the WAN 104 and associated networks other than as shown in FIG. 1. The generic terminals 100, wireless devices 101 and personal computers 116 are hereafter referred to as the terminal 100 for the sake of simplicity. Further, the networks 102, 104, 114 of the system 10 will hereafter be referred to as the network 104, for the sake of simplicity. It is recognized that there could be multiple servers 106, 110, and/or that the functionality of the servers 106 and 110 could be combined, if desired. It is further recognized that the servers 106, 110 could be implemented by a service provider 118 providing a schema-defined service, such as a web service by example. Additionally, applications 107 and/or logical modules 400 thereof could be made available from other servers and/or data repositories connected either to servers 106, 110 and/or to the network 104.

The system 10 is described whereby an application framework 206 (see FIG. 2) manages migration between different versions of the application 107, such as but not limited to an XML defined application. The system 10 can maintain the bulk of the application 107 (e.g. XML Content) and allow code portions of the application 107 to update as desired. Another feature of the system 10 is that application 107 data may be preserved as individual application data portions and application code portions as further described below. It is recognized that XML represents only one example of a structured definition language that can be used to define the application 107. Other example languages can include such as but not limited to HTML, XHTML, XSML, RDF, Machine Readable Cataloging (MARC), and Multipurpose Internet Mail Extensions (MIME). It is further recognized that the system 10 can be suitable to any range of XML-defined applications to be used in conjunction with terminals 100 that may be limited in terms of connectivity, memory and/or storage space. For the sake of simplicity, and expressly not intended as limiting, the application 107 may hereafter be referred to as an XML application 107 for example purposes only.

Generic Terminal

Figure 2:
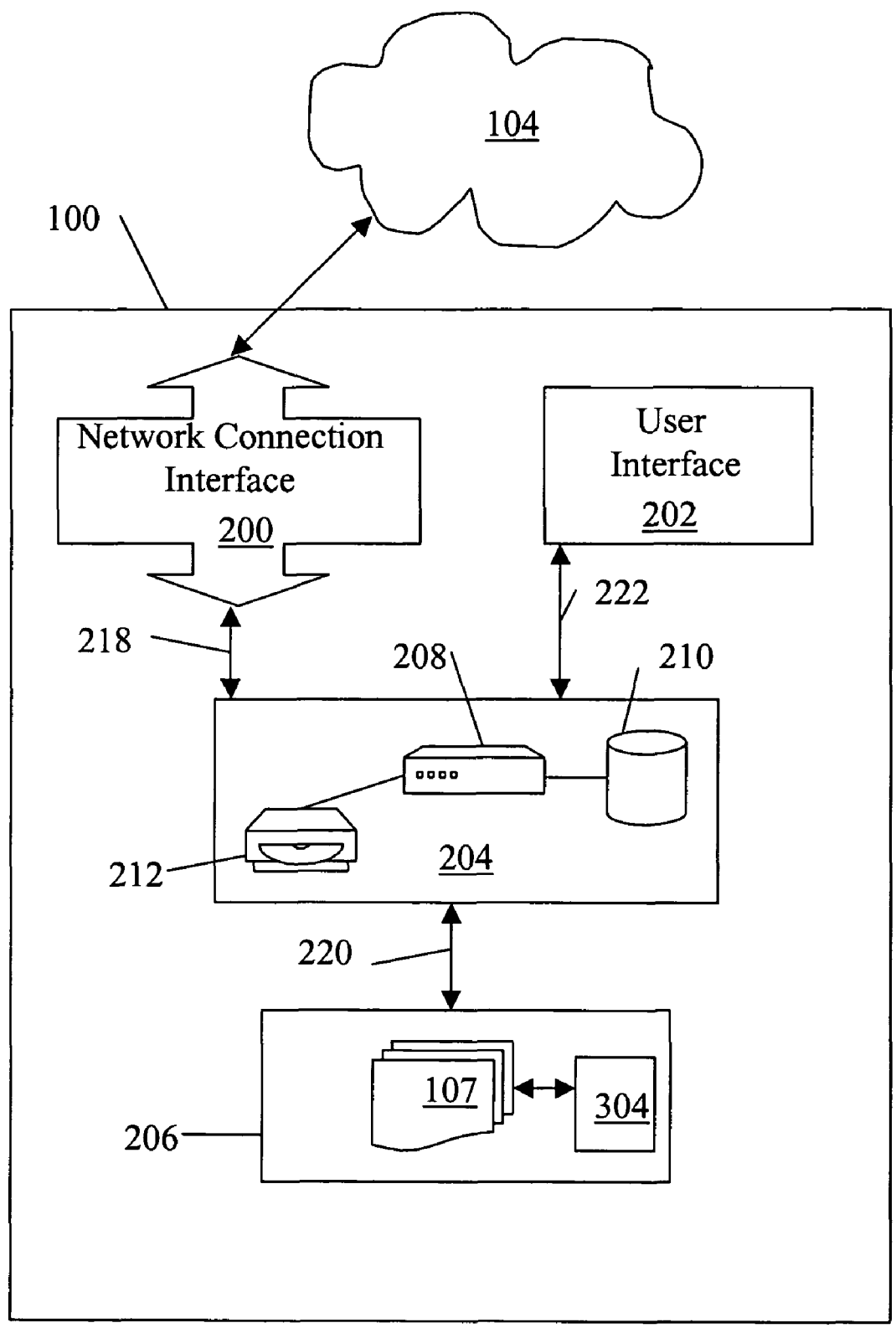
FIG. 2 is a block diagram of a generic terminal of FIG. 1.

Referring to FIG. 2, the terminals 100 can include, without limitation, mobile telephones (or other wireless devices), PDAs, notebook and/or desktop computers, two-way pagers or dual-mode communication terminals. The terminals 100 include a network connection interface 200, such as a wireless transceiver or a wired network interface card or a modem, coupled via connection 218 to a terminal infrastructure 204. The connection interface 200 is connectable during operation of the terminals 100 to the network 104, such as to the wireless network 102 by wireless links (e.g., RF, IR, etc.) (see FIG. 1), which enables the terminals 100 to communicate with each other and with external systems (such as the server 106—see FIG. 1) via the network 104 and to coordinate the requests/response messages 105 between the terminals 100 and the servers 106, 110. The network 104 supports the transmission of modifications to the application programs 107 in the requests/response messages 105 between terminals 100 and external systems, which are connected to the network 104. The network 104 may also support voice communication for telephone calls between the terminals 100 and terminals which are external to the network 104. A wireless data transmission protocol can be used by the wireless network 102, such as but not limited to DataTAC, GPRS or CDMA.

Referring again to FIG. 2, the terminals 100 also have a user interface 202, coupled to the terminal infrastructure 204 by connection 222, to facilitate interaction with a user (not shown). The user interface 202 can includes one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the terminal infrastructure 204. The user interface 202 is employed by the user of the terminal 100 to coordinate the requests/response message messages 105 over the system 10 (see FIG. 1) as employed by the processing framework 206.

Referring again to FIG. 2, operation of the terminal 100 is enabled by the terminal infrastructure 204. The terminal infrastructure 204 includes the computer processor 208 and the associated memory module 210. The computer processor 208 manipulates the operation of the network interface 200, the user interface 202 and the framework 206 of the communication terminal 100 by executing related instructions, which are provided by an operating system and client application programs 107 located in the memory module 210; the computer processor 208 can include one or more processing elements that may include one or more general purpose processors and/or special purpose processors (e.g., ASICs, FPGAs, DSPs, etc.). Further, it is recognized that the terminal infrastructure 204 can include a computer readable storage medium 212 coupled to the processor 208 for providing instructions to the processor for loading/updating client application programs 107. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Processing Framework

Figure 3:
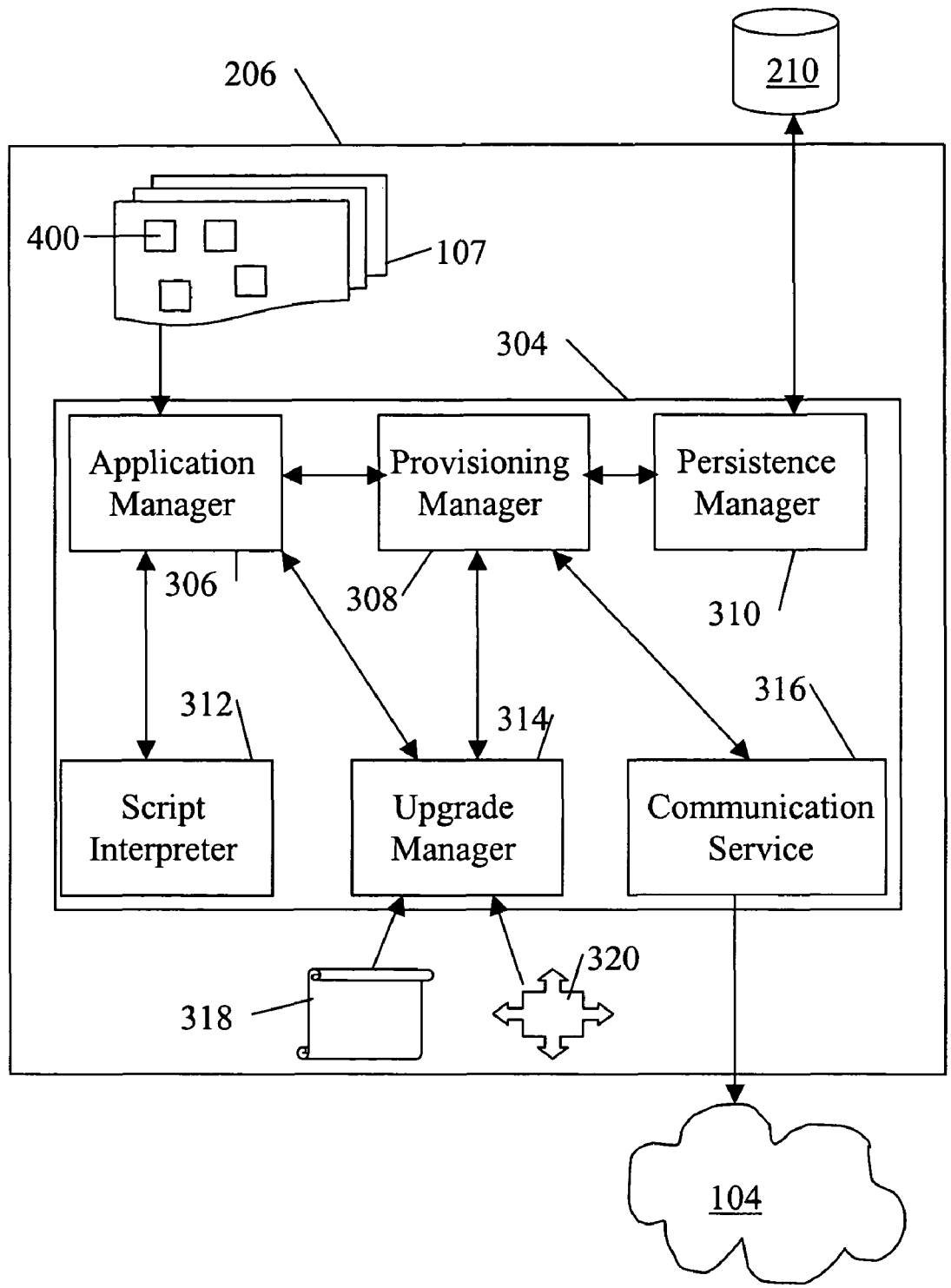
FIG. 3 shows a processing framework of the device of FIG. 2.

Referring to FIG. 3, a client runtime environment is provided by the processing framework 206. Multiple such runtime environments could potentially be available for use by the processing framework 206 of a given terminal 100. The framework 206 of the terminal 100 is coupled to the infrastructure 204 by the connection 220 and is an interface to the terminal 100 functionality of the processor 208 and associated operating system of the infrastructure 204. The client runtime environment of the terminals 100 is preferably capable of generating, hosting and executing the client application programs 107 (which are in the form of a series of modules 400) on the terminal 100; if multiple runtime environments are available, a particular one can be selected for use with a given application program 107. Further, specific functions of the client runtime environment can include such as but not limited to service 304 support for language, coordinating memory allocation, networking, management of data during I/O operations, coordinating graphics on an output device of the terminals 100 and providing access to core object oriented classes and supporting files/libraries. Examples of the runtime environments implemented by the terminals 100 can include such as but not limited to Common Language Runtime (CLR) by Microsoft and Java Runtime Environment (JRE) by Sun Microsystems. It is recognized that the terminals 100 can be configured to operate as clients of the service provider 118 (for example web clients). It is recognized that the client runtime environment can also make the terminals 100 clients of any other generic schema-defined services supplied by the service provider 118.

Referring again to FIG. 3, the processing framework 206 implements the ability to manage a discrete upgrade of the associated modules 400 of the application 107 using instructions provided by a migration script 318 (i.e. a migration instructional set) and interacting with an addressing map 320, further described below. The Processing Framework 206 can provide generic service framework 304 functionality as part of, or separate from, the application program 107. Such a generic service framework functionality can include, without limitation, an Application Manager 306, an Upgrade Manager 314, a Provisioning Manager 308, a Communication Service 316, a Script Interpreter 312, and a Persistence Manager. Other services (not shown) can include a presentation service, an access service and a utility service. It is recognised that separate service functionality can be shared by a plurality of applications 107.

The communication service 316 manages connectivity between the component application programs 107 and the external system 10 via the network 104, including the ability to fetch additional modules 400 as required. The persistence manager 310 allows updated versions of the application programs 107 and/or modules 400 thereof to be stored in the memory module 210. The provisioning manager 308 manages the provisioning of the software applications 107 on the terminal 100. Application provisioning can include storing, retrieving, downloading and removing applications 107, such as requesting and receiving new and updated modules 400, configuring the application programs 107 for access to services which are accessible via the network 104, modifying the configuration of the modules 400, and removing/adding specific modules 400. Further, the provisioning manager 308 can be responsible for providing APIs (application program interfaces) to the applications 107 for enabling dynamic requesting of additional Code or Data Modules 400 or remove same on request, as further described below. The Application Manager 306 can be used to interact with the user interface 202 (see FIG. 2), manages application lifetime etc. The Upgrade Manager 314 manages the upgrade procedure of the application 107, including requesting and executing migration script 318, and manipulating application module 400 partitioning. The Script Interpreter 312 can be used to execute the content of the Modules 400, which in some implementations can be XML content. It is recognized that other configurations of the processing framework 206 with respective services 306, 308, 310, 312, 314, 316 for implementing the application 107 upgrade can be other than shown, as desired.

Application Program Modules

Figure 4:
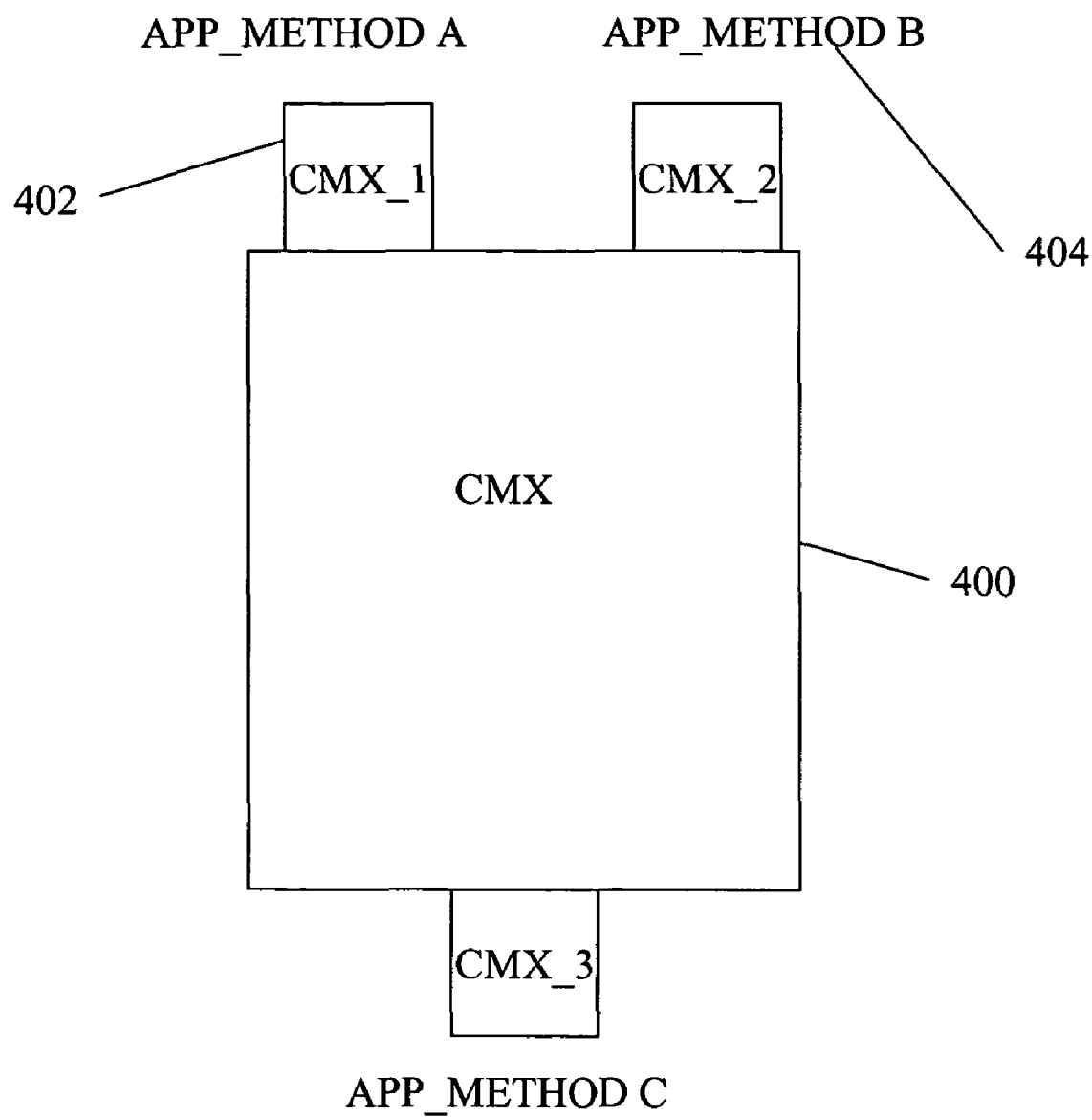
FIG. 4 is a module of an application program of FIG. 3.

Referring to FIG. 4, the example application module 400 represents a single indivisible representation within the application 107. Accordingly, the application 107 can be partitioned by a designer into several non-overlapping and/or overlapping Logical Modules 400, which can be grouped by type. The partitioning of the application 107 can be performed by a designer (not shown), through an automatic process or through a semi-automatic process. Logical Modules 400 may be Code Modules 400 that drive the application 107 behaviour, or may be Data Modules 400 that define how data is represented.

All modules 400 are uniquely addressable via an Addressing Scheme as represented by the addressing map 320. The Addressing Scheme can be an algorithm by which any Code Module 400 may be uniquely identified. Code Modules are considered to export a set of executable methods hereafter referred to as Code Module Ports 402.

The Logical Module 400 may comprise a task to perform (e.g. the Code Module) and/or may describe an entity referenced or manipulated in the application 107 (e.g. the Data Module). The Code Module 400 can be used to represent a collection of instructions (script/code) that satisfy an identifiable, unique and reusable task. The Data Module 400 can be used to represent an aggregate that describes an application 107 component (e.g. data description, message description, screen description etc.). Such descriptions can be provided in a suitable structured definition languages such as XML.

The module 400 has the Code Module Port 402 which represents a private addressable executable function exported by the Code Module 400. The module 400 also has a corresponding public address 404 for the executable methods of the module 400. Accordingly, the public addresses 404 represent shared execution pathways between the modules 400, which are redirectable, whereby knowledge of the addresses 404 is known by both linked modules 400. The shared knowledge of the addresses 404 between modules 400 is contrary to the private addresses 402, which are considered for internal use by the respective module 400 to enable access of the module executable methods by the public addresses 404 (i.e. shared method call).

FIG. 4 and Table 1 serve to illustrate public 404 (visible) versus private 402 addressing. The arbitrary Code Module 400 (i.e. CMX) exposes 3 private ports 402 (i.e. CMX__1, CMX__2, CMX__3). Each of these ports 402 executes a fragment of code, e.g. a function, within the module CMX. Externally, each port 402 is addressed by the public port names 404 (i.e. APP_METHOD A-C). The application content, for example XML Content 500 (see FIG. 5), makes reference to these public addresses 404, which can be as symbols in the contained XML data. It is recognized that internally, the Code Module 400 defines its own set of private names to represent these ports 402, namely CMX__1-3. This separation of public 404 and private 402 naming allows the Code Module 400 to be modified without affecting external public references to the module 400 in the content 500. The Addressing Map 320 (see FIG. 3) maintains the mapping represented by Table 1 between the public 404 references and private 402 names for any version of the application 107 for updating. Accordingly, the addressing map 320 can be specific for a particular addressing representing a specific application 107, or can be used to contain multiple addressing arrangements to represent multiple versions of the same and/or different applications 107.

TABLE 1

Sample Code Module Addressing

| Public Address | Private Address |
| --- | --- |
| APP__METHOD A | CMX__1 |
| APP__METHOD B | CMX__2 |
| APP__METHOD C | CMX__3 |

Figure 5:
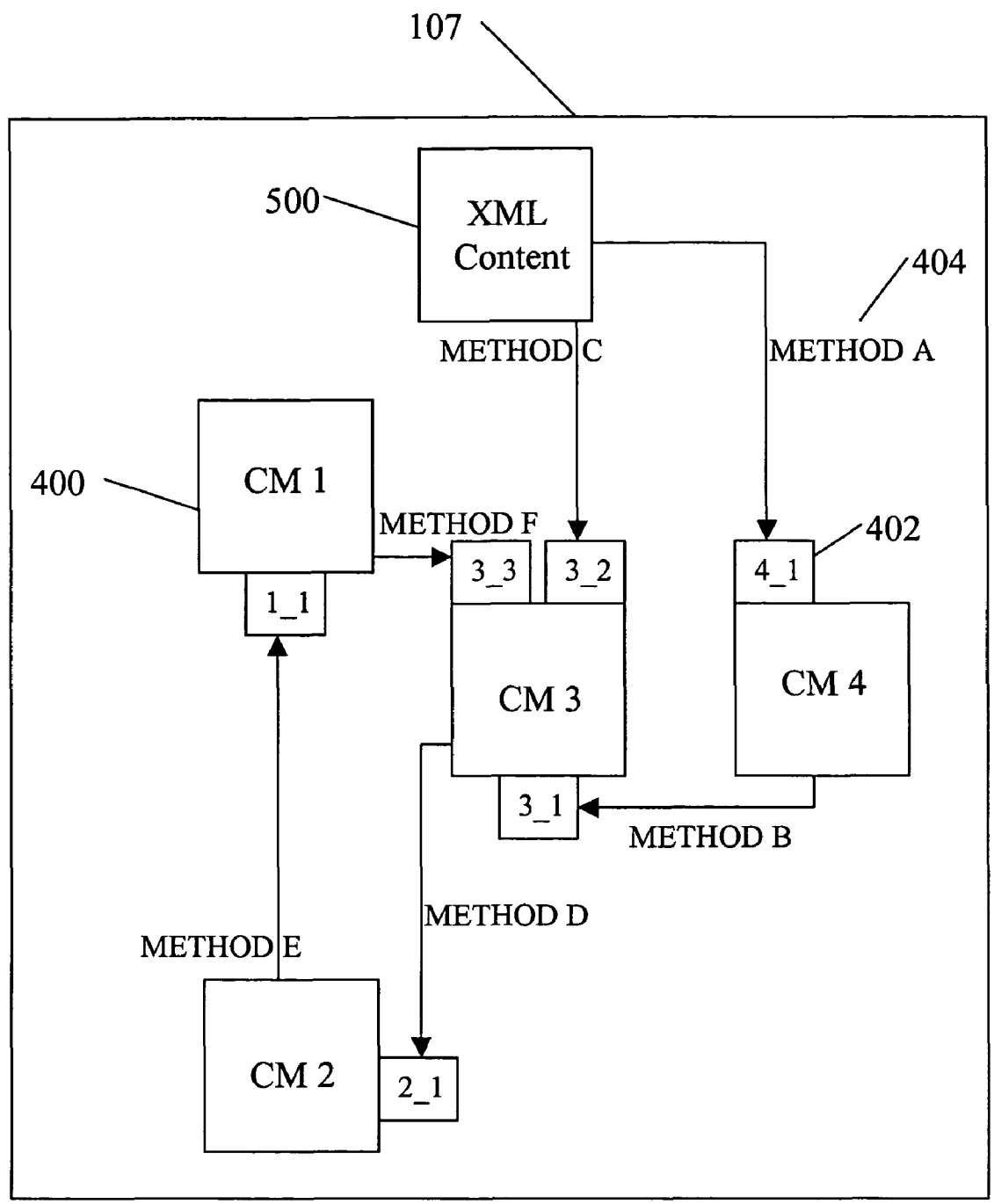
FIG. 5 is an example application program of the program of FIG. 3.

For example, Data Modules 400 generally represent the content of the application 107 and hereafter will be referred to collectively, without limitation, as XML Content 500 (see FIG. 5). XML Content 500 typically makes up the bulk of the XML application 107 and can represent the portion of the entire application 107 definition, comprised of Data Module 400 elements.

Referring to FIGS. 3 and 5, XML Content 500 makes reference to Code Modules 400 that may drive the application 107, affect the presentation of the content, etc. It is preferable to allow this content 500 to remain unaffected when various Code Modules 400 update. Therefore, the partial/modular update of the application 107 can be performed by updating code modules 400 and preferably leaving Data Modules of the XML content 500 unchanged. Preferably, the XML Content 500 is limited to the portion of the application 107 comprised of Data Modules 400 that are unaffected by changes to public addressing 404 imposed by the Addressing Map 320. Any Data Modules 400 affected by changes in the Addressing Map 320 during upgrade would become part of the upgrade procedure via the Migration Script 318.

Referring again to FIG. 3, the processing framework 206 uses the Migration Script 318, the Addressing Map 320, and an Inter-module Addressing Scheme represented by the Addressing Map 320 for facilitating the management of a partial/complete update to the application 107. The migration script 318 contains instructions used by the Processing Framework 206 to complete an upgrade of the application 107. The Migration Script 318 is used at application upgrade time and directs the Processing Framework 206 as to which Code Modules 400 are to be manipulated. The Migration Script 318 also directs downloading of any additional required modules 400 and the location for download of any new versions of the Addressing Map 320 via messages 105 with the server 106 (see FIG. 1). For example, the terminal 100 can execute the migration Script 318 to update portions of the application 107 resident on the terminal 100. The Script 318 can be provided to the terminal 100 by the server 106 or by other suitable means (e.g., serial or parallel port, memory card, removable media, etc.).

The Addressing Map 320 contains a mapping between visible public addresses 404 in the application 107 and the private port names 402 exported by any Code Module 400. The Addressing Map 320 is used by the Provisioning Framework 206 to redirect application method calls to the appropriate Code Module 400 and corresponding Code Module Port 402 for a particular application 107 version update. The Inter-module Addressing Scheme coordinates the addressing of code fragments (i.e. functions) from XML Content 500 or from other Code Modules 400 in the application 107 through the set of predefined public application addresses 404 maintained in the Addressing Map 320. These predefined addresses 404 are the visible representation of execution paths that may be invoked between collaborating entities (e.g., XML Content 500 and Code Modules 400) in the application 107. The underlying and actual representation of these execution paths is determined by the Addressing Map 320. Accordingly, the logical separation of public 404 and private 402 addresses helps individual modules 400 of the application to be upgraded without modifying adjacent modules 400.

Example Application Upgrade

Referring to FIG. 5, the Application 107 is partitioned into XML Content 500 and Code Modules 400. The application 107, by example, contains four arbitrary Code Modules CM1-4, the public execution paths METHOD A-F, and the private ports CM1-1, CM2-1, CM3__1-3 and CM4__1. Table 2 summarizes the Addressing Map 320 for this version of the application 107.

TABLE 2

Addressing Map for sample application prior to upgrade

| Public Address | Private Address | |
|---|---|---|
| | Module | Port |
| APP_METHOD A | CM4 | CM4_1 |
| APP_METHOD B | CM3 | CM3_1 |
| APP_METHOD C | CM3 | CM3_2 |
| APP_METHOD D | CM2 | CM2_1 |
| APP_METHOD E | CM1 | CM1_1 |
| APP_METHOD F | CM3 | CM3_3 |

Figure 6:
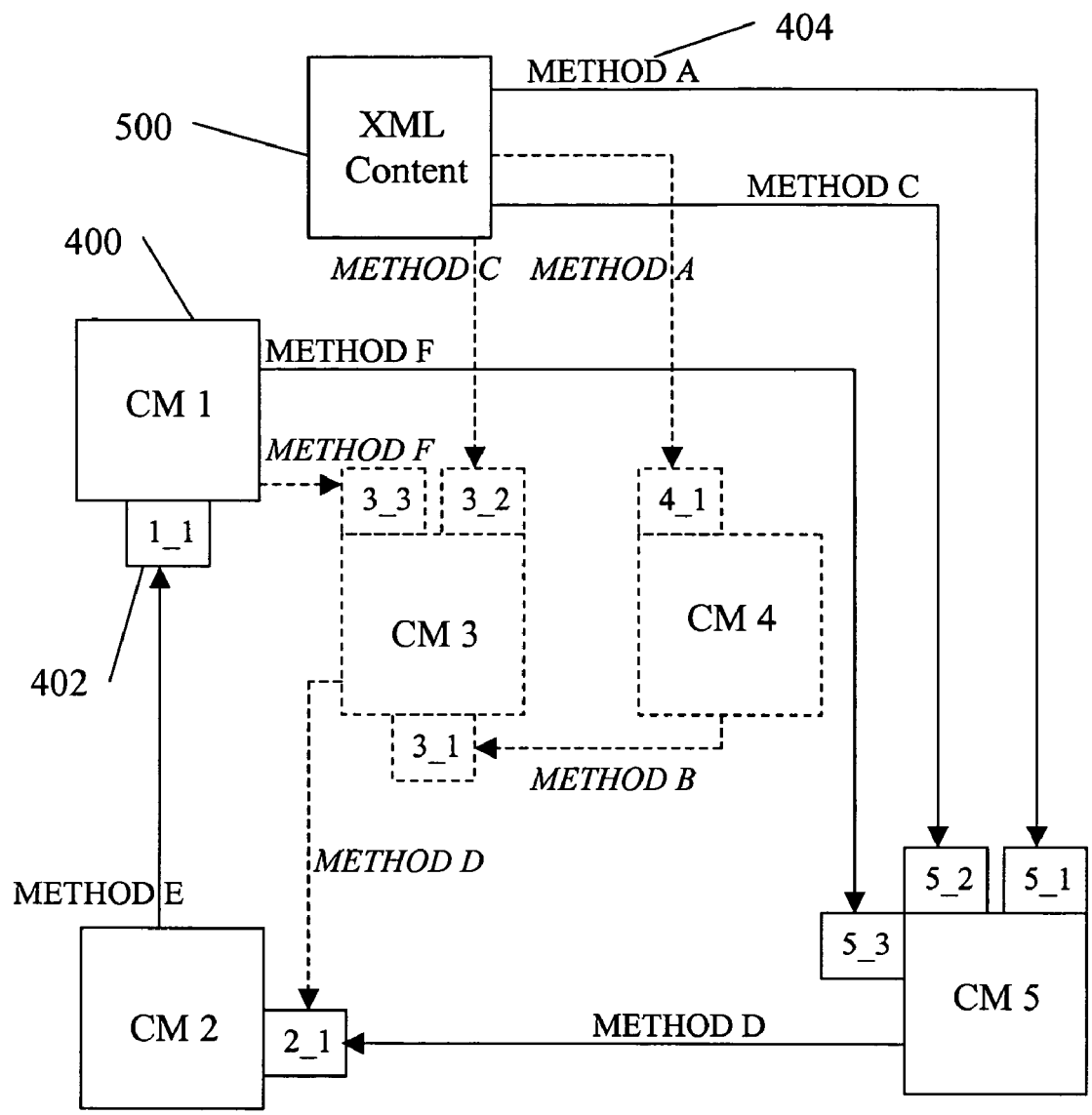
FIG. 6 shows a modified version of the application program of FIG. 5.
Figure 7:
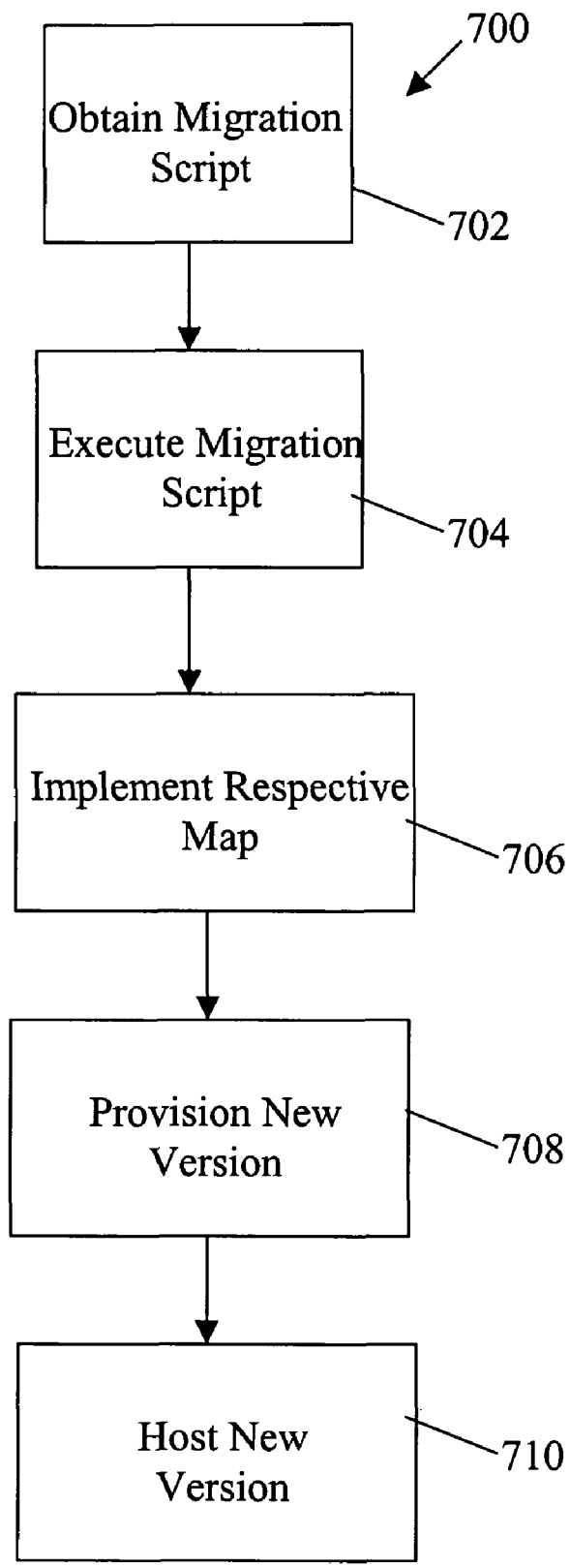
FIG. 7 is a flowchart illustrating modifying the application program of FIG. 3.

Referring to FIG. 6, during upgrade, the Migration Script 318 (see FIG. 3) instructs the Upgrade Manager 314 to remove Code Modules CM3 and CM4 (as shown in dashed lines) along with their corresponding private ports CM3_1-3 and CM4_1. Further, the old execution paths 404 between the XML content 500 and the deleted modules CM3 and CM4 are also shown in dashed lines, namely METHODS A-D, F. The resulting updated application 107 version and revised Address Map 320 are installed by the provisioning manager 308 of the framework 206 on the terminal 100 (see FIG. 3), as depicted in FIG. 6 and Table 3.

TABLE 3

Updated Addressing Map for revised application 107

| Public Address | Private Address | |
|---|---|---|
| | Module | Port |
| APP_METHOD A | CM5 | CM5_1 |
| APP_METHOD C | CM5 | CM3_2 |
| APP_METHOD D | CM2 | CM2_1 |
| APP_METHOD E | CM1 | CM1_1 |
| APP_METHOD F | CM5 | CM5_3 |

Referring again to FIG. 6, it is noted that the upgrade resulted in a combination of defunct, revised/new paths and modules 400. In particular, all references in the addressing map 320 to public addresses 404 that were originally mapped to Code Modules CM3 and CM4 have either been moved or obsoleted. Public addresses 404 that were referenced from the XML Content 500 (the body of the application 107 in this case that has remained unchanged), namely METHOD A and C, have been preserved by reassigning them to private ports 402 CM5_1 and CM5_2 respectively. METHOD B which represented interactions with obsolete modules 400 has been discarded. Further, execution paths METHOD D and METHOD F have been reassigned to respective ports 402 of a new code module CM5. It is recognised that the migration script 318 is used to implement the upgrade by the upgrade manager 314.

Upgrade Process

The Processing Framework 206 can permit the application 107 to be upgraded as a result of either internal or external stimulus in regard to the terminal 100. For the Server Initiated mode, an external server such as the Server 106 (see FIG. 1) detects that a newer version of the application 107 is available, such as indicated by the server 110. In this mode, the external server initiates the request 105 to the terminal Processing Framework 206 (see FIG. 2). The request 105 supplies the location of the migration script 318 (see FIG. 3) or otherwise communicates the script 318 to the terminal 100. It is noted that the decision to proceed with the application 107 upgrade may be left to the user of the terminal 100, or be enforced such as by the server 106 in circumstances where desired. The migration script 318 can be located on the server 106 or others if desired.

For an Application Initiated mode, the Processing Framework 206 may be requested to perform the upgrade as a result of a user request or an internal evaluation on the terminal 100. The terminal 100 in this case would contact the server 106 for the application 107 upgrade information as noted above. It is recognized that the addressing map 320 can be communicated to the terminal 100 by the server 106, or the terminal 100 can update a respective addressing map 320 already in possession by the terminal 100.

Referring to FIGS. 3, 5, 6 and 7, an example upgrade procedure 700 can consist of the following steps:

1. the Processing Framework 206 obtains 702 the Migration Script 318, such as from the server 106 (see FIG. 1);
2. The Upgrade Manager 314 of the framework 206 begins execution 704 of the Migration Script 318, potentially with the help of the script interpreter 312, whereby the Upgrade Manager 314 initiates the download of additional Code (or Data) Modules 400 as required by the Migration Script 318 via the Communication Manager 316 from the server 106 or other locations in the network 10 as designed. Upon application upgrade, Code Modules 400 and/or data modules 400 may be removed, replaced and/or added to the resident application 107 on the terminal 100, as well as the modification/addition and/or deletion of corresponding execution paths related to the ports 402;
3. the Upgrade Manager 314 obtains and implements 706 the appropriate Addressing Map 320 (new or amended) according to the directions of the migration script 318, wherein the addressing map 320 can be obtained by the terminal 100 already updated or the manager 314 can upgrade any existing version addressing map 320;
4. the Upgrade Manager 314 requests 708 the Provisioning Manager 308 to relink the application 107 and save the new application 107 version represented by the updated addressing map 320. The new application 107 version is saved via the Persistence Manager 310; and
5. the Application Manager 306 of the framework 206 hosts 710 the new application 107 version using the updated Addressing Map 320 to determine the correct Code Module ports 402 accesses relating to the public addressing 404 of the XML content 500.

It is recognized that different versions of the Addressing Map 320 and associated code modules 400 can be stored to represent different versions of the application 107. Further, it is recognized that multiple version provisioning can be represented by a single or multiple corresponding addressing maps 320, if desired. Further, utilization of the Addressing Map 320 allows the potential to have multiple different versions of the same application 107 resident on the same terminal 100, sharing common modules 400 rather than duplicating common code modules 400, and operating on the same internal representation of data provided by the XML content 500.

The above description relates to one or more exemplary systems and methods. Many variations will be apparent to those knowledgeable in the field, and such variations are within the scope of the application. For example, it is recognised that implementation of the migration script 318 can be performed by a migration module and implementation of the addressing map 320 can be implemented by an addressing map module. These modules can be made available on the terminal 100 as software, hardware, or a combination thereof.

The embodiments of the invention in which an exclusive property or privilege is claimed are defined as the follows:

1. A computer implemented method for dynamically upgrading and versioning an application program in a terminal, the application program including a plurality of uniquely addressable logical modules and each unique addressable logical modules includes associated executable methods, the plurality of uniquely addressable logical modules are linked by a set of execution pathways, the method comprising the steps of:
   obtaining a migration instruction set for identifying and downloading the unique addressable logical modules of the application program to be replaced;
   executing the migration set to download the plurality of uniquely addressable logical modules;
   executing the migration instruction set to modify a first execution pathway of the set of execution pathways to create a modified application, wherein the first execution pathway represents a redirectable shared method call of a first uniquely addressable logical module of the plurality of uniquely addressable logical modules and links a pair of the plurality of uniquely addressable logical modules;
   constructing an addressing map, by an inter-module addressing scheme, wherein the addressing map maps a direct relationship between the redirected shared method call and a corresponding private address of the first uniquely addressable logical module, wherein the addressing map is configured to modify the first uniquely addressable logical module without modifying an adjacent uniquely addressable logical module and wherein the private address is an internal reference of the first uniquely addressable logical module; and
   storing the addressing map for coordinating hosting of the modified application in the terminal.

2. The method according to claim 1, wherein the plurality of uniquely addressable logical modules include at least one data module for providing data definitions and at least one code module for providing the executable methods.

3. The method according to claim 2, wherein the code module has a collection of instructions to provide a reusable function representing the executable method.

4. The method according to claim 2, wherein the data module represents an aggregate expressed in a structured definition language.

5. The method according to claim 4, wherein the structured definition language is Extensible Markup Language (XML).

6. The method according to claim 2 further comprising the step of configuring the terminal as a client of a schema defined service accessible through a network, the service providing modification requirements of the application program to the terminal.

7. The method according to claim 6, wherein the service is a web service.

8. The method according to claim 6, wherein the terminal is selected from the group comprising wireless devices and wired devices.

9. The method according to claim 2 further comprising the step of modifying the application program to create a new version of the application to produce the modified application, the new version having modifications selected from the group comprising deleted ones of the plurality of uniquely addressable logical modules, new ones of the plurality of uniquely addressable logical modules, modified ones of the plurality of uniquely addressable logical modules, and the redirected shared method call.

10. The method according to claim 9, wherein the executable methods include a new module and an associated execution method.

11. The method according to claim 9 further comprising the step of modifying the code modules and associated execution pathways of the application to produce the new version without changing the shared method call addressing referenced by the data modules.

12. The method according to claim 9, wherein the migration instruction set is a migration script.

13. The method according to claim 12 further comprising the step of providing the migration script to the terminal by a network server.

14. The method according to claim 2, wherein at least one of the code modules has at least two of the private addresses, each of the private addresses representing a respective identifiable function within the code module.

15. The method according to claim 14 further comprising the step of storing a plurality of direct relationships between a plurality of corresponding redirected shared method call and private address pairs for representing multiple versions of the application, the plurality of direct relationships stored in the addressing map.

16. The method according to claim 2 further comprising the step of implementing a service framework by a runtime environment for providing service functionality to the application program.

17. The method according to claim 16, wherein the service framework is shared between a plurality of the applications.

18. The method according to claim 17, wherein the service framework includes services selected from the group comprising; an application manager, an upgrade manager, a provisioning manager, a communications manager, a script interpreter, and a persistence manager.

19. The method according to claim 18 further comprising the step of the provisioning manager providing application program interfaces for enabling dynamic modification of the plurality of uniquely addressable logical modules.

20. The method according to claim 2, wherein modification of the application program is initiated by the terminal or a network server.

21. A terminal for dynamically upgrading and versioning an application program for subsequent provisioning in a native runtime environment, the application program include a plurality of uniquely addressable logical modules and each unique addressable logical modules includes associated executable methods, the plurality of uniquely addressable logical modules are linked by a set of execution pathways, the terminal comprising:
   a processing framework configured to provide the native runtime environment;
   a migration module configured to coordinate the modification of the application program using a migration instruction set, wherein the migration instruction set identifies and downloads the plurality of uniquely addressable logical modules of the application program to be replaced, wherein the migration instruction set is configured for operation by the processing framework to modify a first execution pathway of the execution pathways to create a modified application, wherein the first execution pathway represents a redirectable shared method call of a first uniquely addressable logical module of the plurality of uniquely addressable logical modules and links a pair of the plurality of uniquely addressable logical modules;
   an addressing map module configured to construct an addressing map by an inter-module addressing scheme, wherein the addressing map configured for operation by the processing framework to map a direct relationship between the redirected shared method call and a corresponding private address of the first uniquely addressable logical module, wherein the addressing map is configured to modify the first uniquely addressable logical module without modifying an adjacent uniquely addressable logical module and wherein the private address is an internal reference of the first uniquely addressable logical module of the plurality of uniquely addressable logical modules; and a storage medium configured to store the addressing map for coordinating the hosting of the modified application in the native runtime environment.

22. The terminal according to claim 21, wherein the plurality of uniquely addressable logical modules include at least one data module for providing data definitions and at least one code module for providing the executable methods.

23. The terminal according to claim 22, wherein the code module has a collection of instructions to provide a reusable function representing the executable method.

24. The terminal according to claim 22, wherein the data module represents an aggregate expressed in a structured definition language.

25. The terminal according to claim 24, wherein the structured definition language is Extensible Markup Language (XML).

26. The terminal according to claim 22 wherein the terminal is a client of a schema defined service accessible through the network, the service providing modification requirements of the application program to the terminal.

27. The terminal according to claim 26, wherein the service is a web service.

28. The terminal according to claim 26, wherein the terminal is selected from the group comprising wireless devices and wired devices.

29. The terminal according to claim 22, wherein the modified application is a new version of the application program, the new version configured for having modifications selected from the group comprising deleted ones of the plurality of uniquely addressable logical modules, new ones of the plurality of uniquely addressable logical modules, modified ones of the logical modules, and the redirected shared method call.

30. The terminal according to claim 29, wherein the executable methods include a new module and an associated execution method.

31. The terminal according to claim 29, wherein the code modules and associated execution pathways of the application program are configured to be modified to produce the new version without changing the shared method call addressing referenced by the data modules.

32. The terminal according to claim 29, wherein the migration instruction set is a migration script.

33. The terminal according to claim 32, wherein the migration script is provided to the terminal by a network server.

34. The terminal according to claim 22, wherein the at least one code module is configured to have at least two of the private addresses, each of the private addresses representing a respective identifiable function within the at least one code module.

35. The terminal according to claim 34, wherein the addressing map is configured for storing a plurality of direct relationships between a plurality of corresponding redirected shared method call and private address pairs for representing multiple versions of the application, the plurality of direct relationships stored in at least one of the addressing map.

36. The terminal according to claim 22 further comprising a service framework provided by the processing framework to make available service functionality to the application program.

37. The terminal according to claim 36, wherein the service framework is configured for sharing between a plurality of application programs.

38. The terminal according to claim 37, wherein the service framework includes services selected from the group comprising; an application manager, an upgrade manager, a provisioning manager, a communications manager, a script interpreter, and a persistence manager.

39. The terminal according to claim 38 further comprising the provisioning manager configured for providing application program interfaces to enable dynamic modification of the plurality of uniquely addressable logical modules.

40. The terminal according to claim 22, wherein modification of the application program is initiated by the terminal or a network server.

41. A computer readable storage medium having a computer program product for dynamically upgrading and versioning an application program for subsequent provisioning in a native runtime environment, the application program include a plurality of uniquely addressable logical modules and each uniquely addressable logical module includes associated executable methods, the plurality of uniquely addressable logical modules are linked by a set of execution pathways, the computer program product comprising:

a migration module configured to coordinate the modification of the application program using a migration instruction set, wherein the migration set identifies and downloads the plurality of uniquely addressable logical modules of the application program to be replaced, wherein the migration instruction set is configured for operation by the processing framework to modify a first execution pathway of the execution pathways to create a modified application, wherein the first execution pathway represents a redirectable shared method call of a first uniquely addressable logical module of the plurality of uniquely addressable logical modules and links the plurality of uniquely addressable logical modules; and an addressing map module coupled to the migration module and configured to construct an addressing map by an inter-module addressing scheme, wherein the addressing map configured for operation by the processing framework to map a direct relationship between the redirected shared method call and a corresponding private address of the first uniquely addressable logical module executable method, wherein the addressing map is configured to modify the first uniquely addressable logical module without modifying an adjacent uniquely addressable logical module and wherein the private address is an internal reference of first uniquely addressable logical module.

42. A terminal having a runtime environment and configured to interact with a network server to dynamically upgrade and version an application program, the application program include a plurality of uniquely addressable logical modules and each uniquely addressable logical module includes associated executable methods, the plurality of uniquely addressable logical modules are linked by a set of execution pathways, the terminal comprising:

a migration instruction set configured to communicate over a network between the network server and the terminal to coordinate the modification of the application program, wherein the migration instruction set identifies and downloads the plurality of uniquely addressable logical modules of the application program to be replaced, wherein the migration instruction set is configured to modify a first execution pathway of the execution pathways to create a modified application, wherein the first execution pathway represents a redirectable shared method call of a first uniquely addressable logical module of the plurality of uniquely addressable logical modules and links a pair of the plurality of uniquely addressable logical modules; and an inter-module addressing scheme configured to construct an addressing map, wherein the addressing map is configured to map a direct relationship between the redirected shared method call and a corresponding private address of the first uniquely addressable logical module, wherein the addressing map is configured to modify the first uniquely addressable logical module without modifying an adjacent uniquely addressable logical module and wherein the private address is an internal reference of the first plurality of uniquely addressable logical module; and a storage medium configured to store the addressing map for coordinating the hosting of the modified application in the runtime environment of the terminal.

* * * * *